(No Model.) 2 Sheets—Sheet 1.

H. SCHUMACHER.
WINDING MECHANISM FOR TIMEPIECES.

No. 524,671. Patented Aug. 14, 1894.

Witnesses:

Inventor,
Henry Schumacher
By Dewey & Co.
Attys (No Model.) 2 Sheets—Sheet 2.

H. SCHUMACHER.
WINDING MECHANISM FOR TIMEPIECES.

No. 524,671. Patented Aug. 14, 1894.

Witnesses,

Inventor,
Henry Schumacher
By Dewey & Co.
Attys

UNITED STATES PATENT OFFICE.

HENRY SCHUMACHER, OF SAN FRANCISCO, CALIFORNIA.

WINDING MECHANISM FOR TIMEPIECES.

SPECIFICATION forming part of Letters Patent No. 524,671, dated August 14, 1894.

Application filed April 25, 1892. Serial No. 430,604. (No model.)

*To all whom it may concern:*

Be it known that I, HENRY SCHUMACHER, a subject of the Emperor of Germany, residing in the city and county of San Francisco, State of California, have invented an Improvement in Automatic Winding Mechanism for Timepieces; and I hereby declare the following to be a full, clear, and exact description of the same.

My invention relates to the class of timepieces, and particularly to their winding mechanisms.

The object of my invention is to automatically wind up a clock or other time-piece, by means of a separate power mechanism applied to renew the power device of the time-piece movement at such intervals, that whether said power device be a spring or a weight its energy shall be constant, and shall continue until the separate power mechanism shall have been exhausted. By this invention a time-piece can be made to run steadily and evenly without attention for as long a time as the life of the separate power mechanism will permit. Where a spring is used for the power device of the time-piece movement, its power may be utilized within such given limits, on account of being renewed at stated intervals, that its energy will be practically a constant factor. Where a weight is used (and to this class of time-pieces, the invention is most applicable) the power will be absolutely constant and will be continuous by reason of being periodically raised during the life of the separate power mechanism, which can be made as long as desired.

My invention consists in connection with the power device, whether weight or spring, of the time-piece movement, of a separate power winding mechanism and suitable means operated by the power device of the time-piece movement to throw, at stated intervals, the power winding mechanism into and out of connection with said power device of the time-piece movement, to periodically wind up or renew and relieve said device.

It also consists in the novel construction and arrangement of parts hereinafter fully described and specifically pointed out in the claims.

Figure 1:
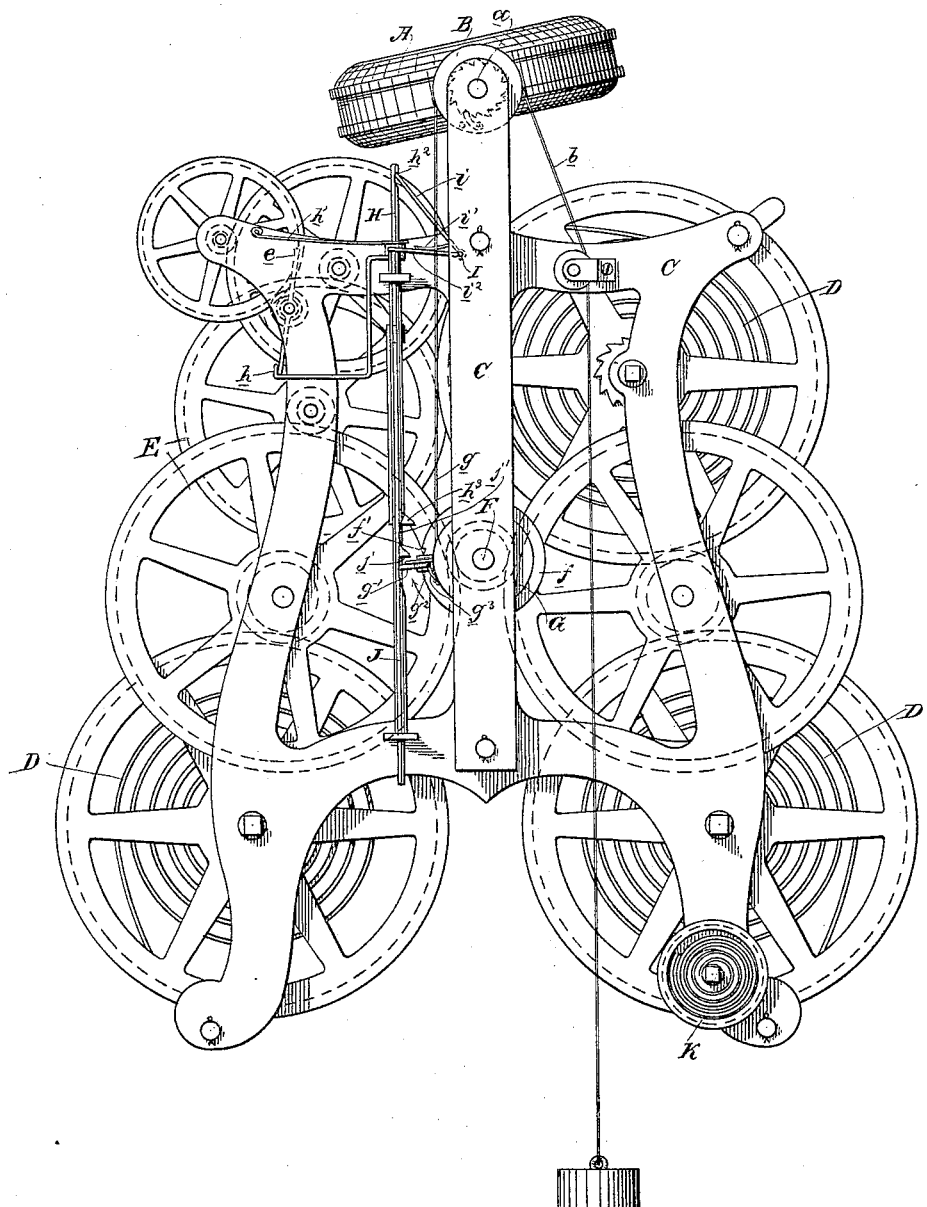
Figure 2:
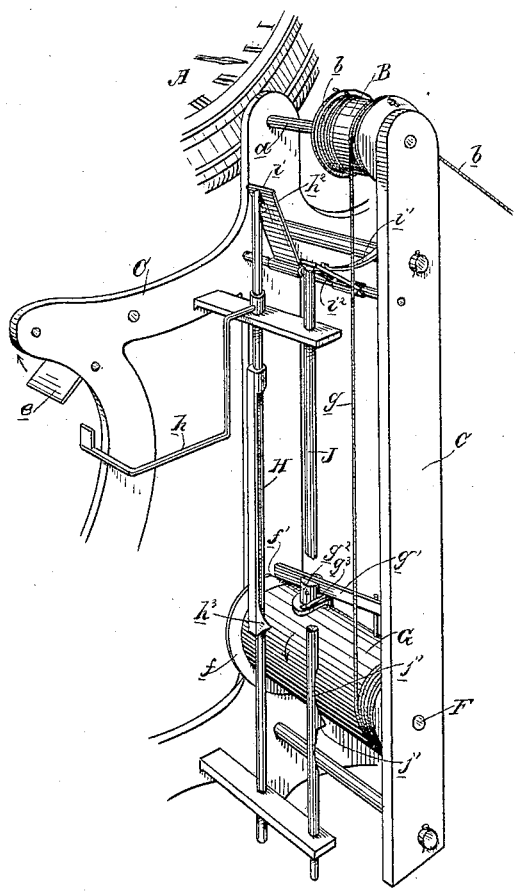

Referring to the accompanying drawings for a more complete explanation of my invention,—Figure 1 is a side elevation of my winding mechanism. Fig. 2 is a perspective view of the entire tripping mechanism.

A is a time-piece of any character. It has the winding arbor $a$ of the time movement. Upon this arbor is a drum B, to which is connected the cord $b$ of the suspended weight W. This weight operates the time movement.

C is the frame-work of my winding mechanism. It carries one or more power springs D, here shown as three in number, though the number is immaterial, the object being to provide suitable power to raise the weight. These springs are adapted to be wound up when required, by the application of suitable keys thereto.

The springs operate gear trains represented generally by E, and having the governor $e$. The final shaft of this gearing is F, and it carries a disk $f$ having a tooth or notch $f'$.

Loosely mounted on shaft F is a winding drum G, to which a cord G is connected, the other end of the cord being connected with drum B. Connection is made and broken between the drum G and the tooth disk $f$ of shaft F by means of a pawl $g'$ pivoted to a post $g^2$ on the drum, and controlled by a spring $g^3$ so that its inner end lies normally in the path of the tooth $f'$ of disk $f$.

From this construction it will be seen that as weight W descends turning drum B, drum G, by means of connecting cord $g$ will turn freely, its pawl traveling over the smooth surface of the disk $f$ until it encounters the tooth $f'$ of said disk. If now the disk which had been stationary, commences to turn in an opposite direction, its tooth engaging the pawl $g'$ will pick up drum G and turn it back again, thus winding up the weight W. This effect upon the weight, to be periodical and within limits, must be dependent upon a mechanism to control the starting and stopping of the shaft F. It is as follows:

Within the path of rotation of the governor fan $e$ lies a stop arm $h$, which is carried by a vertical drop rod H which may depend on gravity for its fall, or it may be assisted by a spring $h'$ as here shown. When this rod is lifted, the stop arm $h$ is raised into the path of the governor fan $e$ and arrests it and thereby stops the winding mechanism. When it drops the arm is removed from the fan, and the mechanism is at once set in operation. The drop rod H is held elevated to hold its stop arm in position to normally hold the winding mechanism at rest, by means of an arm $i$ on a rock shaft I, controlled by a spring $i'$. This arm engages a notch $h^2$ near the top of the drop rod.

The rock shaft is operated by means of a lift rod J, the upper end of which is adapted to bear up under an arm $i^2$ on said shaft. In this lift rod is a notch $j$ under which the outer end of the pawl $g'$ on drum G is adapted to bear, whereby it raises said rod.

The operation continued is as follows:— When drum G under the power of descending weight W is turned around until its pawl comes in contact with notch $j$, the lift rod J is raised. Its upper end bearing under arm $i^2$ rocks shaft I, which thereupon removes its arm $i$ from drop rod H. This rod falls and thereby removes its stop arm $h$ from the path of the governor $e$, and immediately the general mechanism commences to operate. Shaft F turns, and the tooth $f'$ of its disk $f$, coming in contact with the pawl $g'$ will pick up and reverse drum G, thereby winding up the weight W. To terminate this operation, the mechanism is as follows: Upon the drop rod H is a yielding spring stop $h^3$ lying in the path of pawl $g'$. The pawl in passing it merely forces it back, but after the pawl has passed, said stop springs back over it. On the lift rod J is an incline or cam $j'$ lying in the path of the pawl $g'$, and said pawl in descending comes in contact with said cam at a point on the pawl beyond its pivot whereby the inner end of said pawl is removed from engagement with the tooth of disk $f$.

To continue the operation:—When drum G is reversed as above described, its pawl in due time reaches and passes stop $h^3$ of the drop rod H, which springs in above it. Then immediately the pawl reaches the cam $j'$ of lift rod J, and is by it forced from its engagement with the tooth of disk $f$. Drum G being now free of disk $f$ is subject once more to weight W, and it immediately begins to turn in its first direction. In thus turning it rises under stop $h^3$ and thereby raises drop rod H, so that its stop arm $h$ is lifted into the path of the governor, and the winding mechanism is stopped, and rod H is now held up by its top notch $h^2$ engaging the arm $i$ of rock shaft I. In practice this operation is instantaneous, even where a tension spring is used in the time movement, for the reason that its partial exhaustion during the time of its release from the influence of the weight while being raised permits a sudden drop of said weight upon being freed from the winding mechanism, which drop is sufficient to carry drum G on its forward movement far enough and with enough suddenness to instantly stop the winding mechanism.

The complete operation of the device is as follows:—At the start, the weight is descending and acts through drum B to operate the time movement. Drum B is turning drum G slowly to the right, said last named drum turning freely on shaft F, as its pawl travels over the smooth face of disk $f$ of said shaft. Shaft F is stationary, its power gearing being at rest, due to the stoppage of its governor $e$ by stop arm $h$ of the drop rod H. This rod is raised and held up by arm $i$ of rock shaft I. The lift rod J is down. The weight continues to descend and the drum G continues its movement to the right, until its pawl $g'$ reaches notch $j$ of lift rod J. Bearing up in this notch, the pawl lifts said rod, the upper end of which by contact with arm $i^2$ rocks shaft I, which removing its other arm $i$ from the top notch of rod H, said rod drops. This removes arm $h$ from the governor $e$ and thereupon the mechanism is set in operation, and shaft F begins to turn to the left. The tooth $f'$ of its disk $f$ comes in contact with pawl $g'$ and carrying it with it, turns drum G back in a reverse direction. Lift rod J drops back and the drum G turning in its new direction, causes drum B to wind up the weight. This continues until drum G having been turned back nearly to its point of beginning, its pawl $g'$ passes stop $h^3$ which springs in above it, and as the pawl continues to move down, it is acted on by cam $j'$ to effect its release from the tooth $f'$ of disk $f$. Drum G being thus released is turned suddenly to the right again by the drop of the weight, and its pawl rising under stop $h^3$ lifts drop rod H, which throws its stop arm $h$ in the path of the governor $e$, and the mechanism is at rest, the drop rod being held elevated by arm $i$. Thus the weight descends a given distance, and steadily operates the time movement. At a certain point it is raised again. This continues until the power of the springs D is exhausted. They can then be rewound and the mechanism is ready for action again.

In some cases, where, as at sea, a weight is impracticable the necessary power to operate the time movement can be furnished by a spring actuated disk or reel K to which the cord $b$ may be attached. The spring of this disk may be so wound up initially that it will exhaust itself but little during the periods between the operation of the winding mechanism, when it will recover its power, so that it will be practically as constant in its application of power to the time movement as a weight would be.

It is not necessary that the time-piece be located in the position here shown, as it may be separate from the winding mechanism.

Having thus described my invention, what I claim as new, and desire to secure by Letters Patent, is—

1. The combination with a time movement, of an auxiliary winding movement comprising a train of driven gearing the final shaft of which is provided with a notched disk and a loose drum having a pawl to engage said notch, means for disengaging the pawl, a connection between said loose drum and the winding shaft of the said time movement, means for automatically locking and releasing the auxiliary winding mechanism at stated intervals to permit the drum to turn loosely in one direction and to permit it to be turned in an opposite direction by the notched disk when the pawl engages its notch and thereby operate the winding shaft of the time movement, substantially as herein described.

2. In combination with a rotating drum connected with the time-piece movement, and a power device such as a weight or spring connected with and operating the drum, the separate power mechanism having the shaft F with tooth disk $f$ the pawl carried by the drum for making and breaking connection with said tooth disk, a stop for arresting and relieving the power mechanism, intermediate connections operated by the drum for actuating the stop, and means for throwing the pawl into and out of engagement with the tooth disk of the power mechanism shaft, substantially as herein described.

3. In combination with a rotating drum connected with the time-piece movement, and a power device such as a weight or spring connected with and operating the drum, the separate power mechanism having the shaft F with tooth disk $f$ the pawl carried by the drum for making and breaking connection with said tooth disk, a stop for arresting and relieving the power mechanism, intermediate connections operated by the drum for actuating the stop, and means for throwing the pawl into and out of engagement with the tooth disk of the power mechanism shaft, consisting of the cam against which the pawl bears to raise it from its engagement, substantially as herein described.

4. In combination with a rotating drum connected with the time-piece movement, and a power device such as a weight or spring connected with and operating the drum, the separate power mechanism having the shaft F with tooth disk $f$, the pawl carried by the drum for making and breaking connection with said tooth disk, a stop for arresting and relieving the power mechanism, intermediate connections operated by the drum for actuating the stop, consisting of the drop rod H, carrying said stop and having a top notch, the yielding spring top of said rod in the path of the pawl, the rock shaft with its arms, and the lift rod acting under one of the arms of the rock shaft and having a notch in the path of the pawl, and means for throwing the pawl into and out of engagement with the tooth disk of the power mechanism shaft, substantially as described.

5. In combination with a rotating drum connected with the time-piece movement, and a power device such as a weight or spring connected with and operating the drum, the separate power mechanism having the shaft F with tooth disk $f$, the pawl carried by the drum for making and breaking connection with said tooth disk, a stop for arresting and relieving the power mechanism, intermediate connections operated by the drum for actuating the stop, consisting of the drop rod H, carrying said stop and having a top notch, the yielding spring stop of said rod in the path of the pawl, the rock shaft with its arms, and the lift rod acting under one of the arms of the rock shaft and having a notch in the path of the pawl, and means for throwing the pawl into and out of engagement with the tooth disk of the power mechanism shaft, consisting of the cam on the lift rod against which the pawl bears to raise it from its engagement, substantially as herein described.

In witness whereof I have hereunto set my hand.

HENRY SCHUMACHER.

Witnesses:
S. H. NOURSE,
H. F. ASCHECK.